(No Model.) 3 Sheets—Sheet 1.

J. A. BOOTH.
MACHINE FOR SOLDERING END PIECES ON CANS.

No. 405,822. Patented June 25, 1889.

Witnesses:
Fred. S. Greenleaf
Frederick L. Emery

Inventor:
James A. Booth
by Crosby & Gregory attys

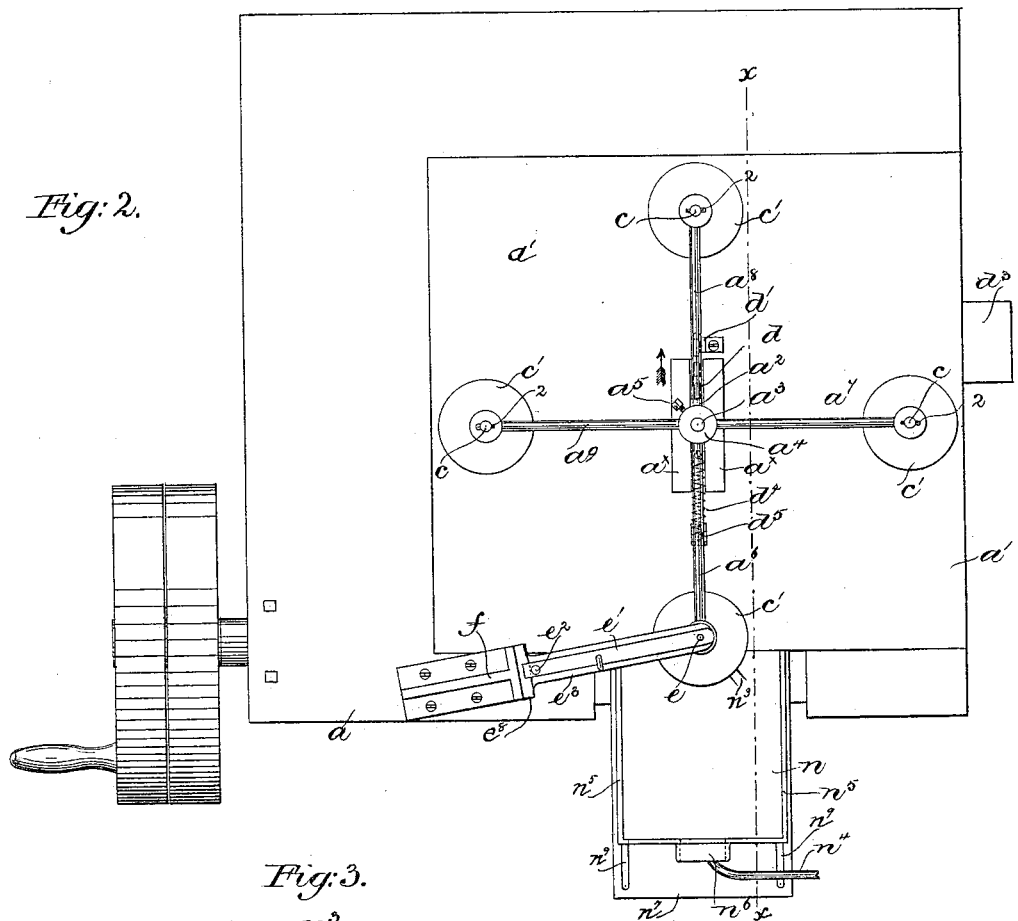

(No Model.) 3 Sheets—Sheet 3.
J. A. BOOTH.
MACHINE FOR SOLDERING END PIECES ON CANS.

No. 405,822. Patented June 25, 1889.

Witnesses.
Fred. S. Greenleaf
Frederick L. Emery

Inventor.
James A. Booth
by Crosby & Gregory
Attys

UNITED STATES PATENT OFFICE.

JAMES A. BOOTH, OF BOSTON, MASSACHUSETTS.

MACHINE FOR SOLDERING END PIECES ON CANS.

SPECIFICATION forming part of Letters Patent No. 405,822, dated June 25, 1889.

Application filed December 10, 1888. Serial No. 293,088. (No model.)

*To all whom it may concern:*

Be it known that I, JAMES A. BOOTH, of Boston, county of Suffolk, State of Massachusetts, have invented an Improvement in Machines for Soldering End Pieces on Cans, of which the following description, in connection with the accompanying drawings, is a specification, like letters on the drawings representing like parts.

This invention has for its object to construct a machine for soldering heads or end pieces on can-bodies.

In accordance with this invention, the cylinder or can-body, having placed on its lower end a flanged head or end piece, is conveyed by a suitable holder into position between two spindles, preferably a live and a dead spindle. Mechanism is provided for moving one of the spindles toward the other to clamp between them the can-body and its holder. Suitable mechanism is provided for rotating the live-spindle to impart rotary motion to the can-body. A suitably-shaped trough or receptacle is employed, it being so arranged as to deliver hot solder at a single point to the flange of the head or end piece, or between the flange and the can-body, so that as the can-body is rotated the hot solder will be properly delivered entirely around the flange. A heater of any suitable construction is employed to keep the solder trough or receptacle hot. The holders will be made of any suitable size to accommodate cans of different sizes.

Figure 1:
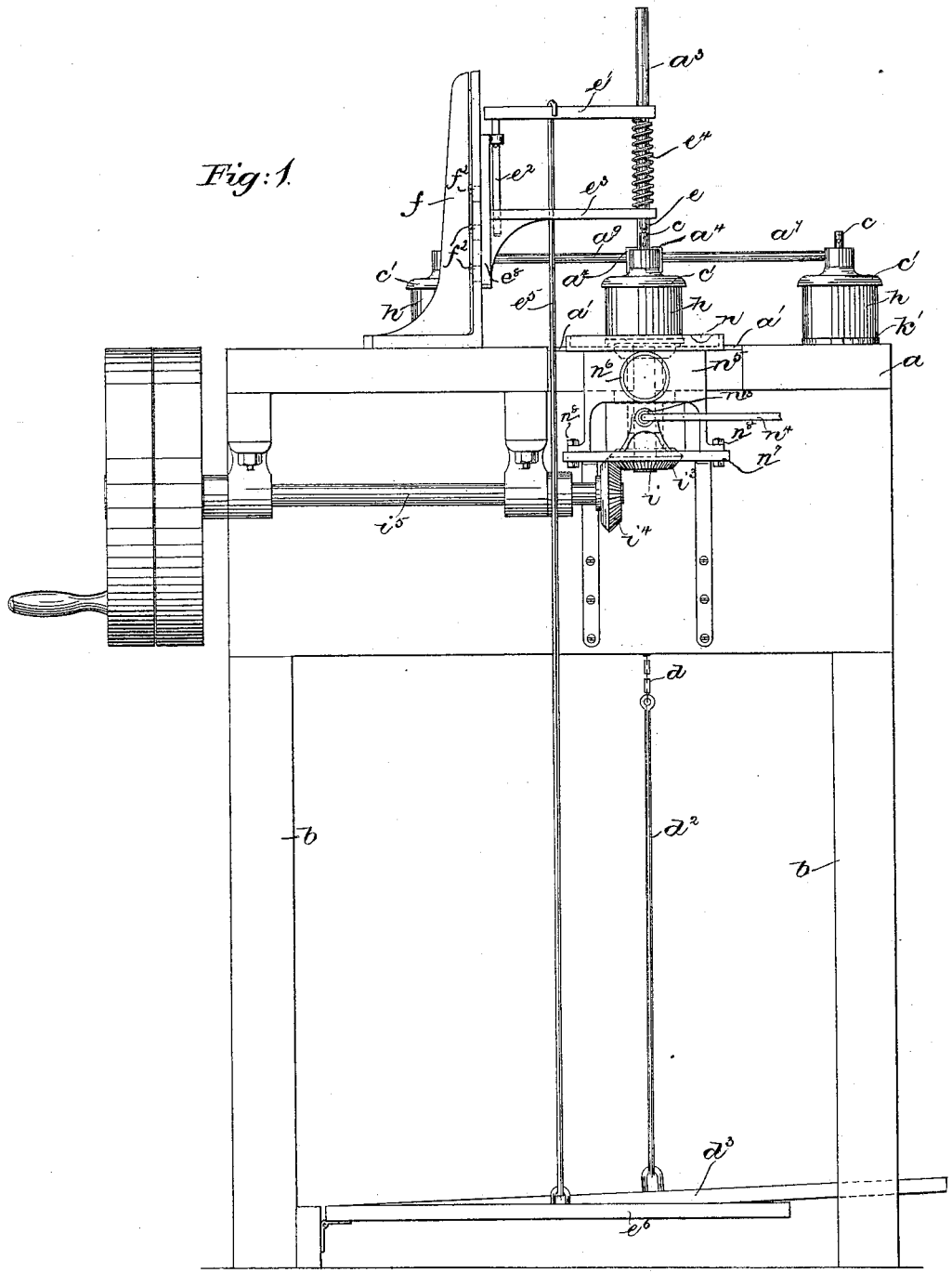
Figure 7:
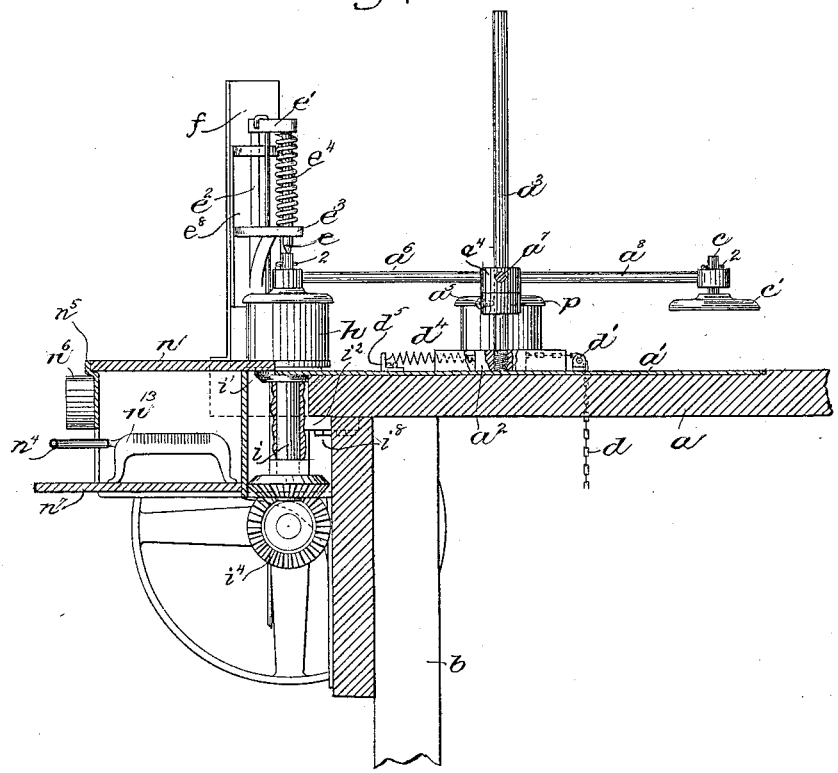

Figure 1 shows in side elevation a machine for soldering heads or end pieces on can-bodies embodying this invention; Fig. 2, a plan view of the machine shown in Fig. 1; Fig. 3, a detail of the hot-solder trough or plate; Fig. 4, a sectional detail of one of the holders; Figs. 5 and 6, details of the live-spindle, to be referred to; Fig. 7, a longitudinal section of the machine shown in Fig. 2, taken on the dotted line $x\,x$.

The main frame-work comprises, essentially, the table $a$ and legs $b$. A metallic bed-plate $a'$ is secured or set into the top of the table $a$, it having two upwardly-extended parallel projections $a^\times$, at or near its center, presenting a guideway for a rectangular block $a^2$, fitted to slide therein. (See Figs. 2 and 7.) A rod $a^3$ is fixed to the block $a^2$, rising vertically thereon, upon which rod is mounted a collar $p$, having a set-screw $a^5$, by which it may be secured in any desired position thereon. A hub $a^4$ is placed loosely on the rod $a^3$, resting on the collar $p$.

Several arms, herein shown as four in number, as $a^6\,a^7\,a^8\,a^9$, radiate from the hub $a^4$ in a plane parallel with the bed-plate, and at the terminus of each arm a block is fixed, which is bored centrally to receive the shank $a$ of a holder. Each holder comprises a disk $c'$, recessed upon its under side to receive a can-body $h$, and attached centrally to the shank $c$. The shanks $c$ of the holders are made long enough to extend up through the blocks, and pins 2 are placed in holes in the shanks to prevent removal of the holders from the blocks. The holders are thereby permitted a limited vertical movement. As the hub $a^4$ is loose on the rod $a^3$, the arms carrying the holders may consequently swing freely, and the holders being loosely held by the blocks or holes formed in the ends of the arms, may also be revolved independently.

A chain or cord $d$ is attached to one end of the block $a^2$, it passing over a roller $d'$ and being connected to the treadle-rod $d^2$ of a treadle $d^3$. A spring $d^4$ (see Fig. 7 and dotted lines, Fig. 2) is attached one end to the opposite end of the block $a^2$ and the other end to a post $d^5$. By means of the treadle $d^3$ the block $a^2$ may be moved in the direction of the arrow, Fig. 2, while the tendency of the spring is to return the block.

A dead-spindle $e$ is fixed to one end of an arm or cross-bar $e'$, and at the opposite end of the said cross-bar a guide-rod $e^2$ is fixed, said spindle and guide-rod passing through holes formed in a cross-bar $e^3$, adapted to be held stationary and serving as a guide. A spring $e^4$ surrounds the spindle $e$ between the bars $e'\,e^3$, the tendency of which is to normally keep the cross-bar $e'$ in elevated position. A treadle-rod $e^5$ connects the bar $e'$ with a treadle $e^6$, so that by depressing the said treadle the cross-bar $e'$ and its dead-spindle $e$ will be depressed. The bar $e^3$ is attached to an upright or bracket $f$ by screws $f^2$, passing through the plate $e^8$, to which the bar $e^3$ is rigidly attached at substantially right angles thereto, and thence through slots in the said bracket, so that vertical adjustment of the bar $e^3$ is obtainable. The live-spindle $i$ is mounted in the bed-plate, and has at its upper end a small disk $i'$, which revolves in a plane parallel with the bed-plate, but slightly above it.

The spindle $i$ (see dotted lines, Fig. 6) revolves in a bearing $i^{10}$, which is held stationary by lugs $i^2$, secured to the under side of the table by suitable bolts $i^3$. The spindle $i$ has at its lower end a bevel-toothed gear $i^3$, which is engaged by a bevel-toothed gear $i^4$, fixed to a horizontal shaft $i^5$, having its bearings in brackets on the under side of the table. A belt-pulley or hand-wheel is fixed to said shaft $i^5$ for rotating it, and thereby rotating the live-spindle.

A solder trough, plate, or shelf $n$ is secured to suitable brackets $n^5$, attached to the main frame-work, said plate abutting against the edge of the bed-plate $a'$, and having a semicircular recess in said abutting edge to receive in part concentrically the disk $i'$ of the live-spindle. The plate $n$ is made much thicker than the bed-plate, or so as to lie above a plane with said bed-plate, and the semicircular recess $n'$ has an annular groove $n^2$, (see Fig. 3,) the lower edge of which lies substantially flush with the top of the disk $i$. The plate $n$ has a small recess $n^3$ in its top, serving as a delivery for the solder from the top of the plate to a point near the annular groove $n^2$. The solder-plate $n$ is heated by any suitable heating apparatus, an ordinary Bunsen burner $n^{13}$, attached to a gas-pipe $n^4$, being herein shown. The burner $n^{13}$ is placed in a chamber, three sides of which are formed by the brackets $n^5$, the chamber being provided with a flue $n^6$, and directly beneath the plate $n$, the bottom of said chamber being the plate $n^7$, to which the brackets $n^5$ are attached by suitable bolts $n^8$, (see Fig. 1,) which pass through slots $n^9$ in the plate $n^7$, (see Fig. 2,) to admit of adjustment of the same toward the bed-plate $a'$.

In operating the machine a can-body $h$, having a flanged head or end piece K' placed on its lower end, is placed on the plate $a'$, beneath one of the holders $c'$, the holder being lifted to receive it, and the operator, grasping the can-body, moves the same over the bed-plate and lifts it upon the disk $i'$, the dead-spindle $e$ at the same time being lifted against the action of the spring $e^4$ until it bears upon the upper end of the shank $c$, the can-body thus being held between the dead spindle and the live-spindle $i$, its flanged head or end resting on the disk $i'$ and also entering the semicircular recess of the solder-plate $n$, the flange of the head entering the groove $n^2$ therein. The treadle $e^6$ is then depressed until the dead-spindle bears heavily upon the upper end of the shank $c$ of the holder. The shaft $i^5$ is then revolved, and the can-body, being clamped between the live and dead spindles, is rapidly revolved, at which time a stick of solder is presented to the heated plate $n$ at the upper end of the recess $n^3$, the solder as it melts being permitted to flow down the said recess and to be delivered on the flange of the head, entering between the flange and the can-body, and as the can-body is being rotated the molten solder comes in contact therewith completely around the circumference of the can. The treadle $e^6$ is then released, the arms again swung a quarter of a revolution in advance, and another can presented between the live and dead spindles. As the successive operations are continued, the cans are successively headed.

I claim—

1. In a machine for securing end pieces to cans, the recessed can-holder to receive and hold one end of the can-body, combined with the live and dead spindles separated and independent of each other, to receive between them the said can-holder and the can held by it, with the bottom of the can resting on the top of said live-spindle, substantially as described.

2. In a machine for securing end pieces to cans, the recessed can-holder and the bearing in which it freely turns, combined with the live and dead spindles, one of which is movable in the direction of its length, whereby the said can-holder and can held by it may be received between the spindles and rotated, substantially as described.

3. In a machine for securing end pieces to cans, the recessed rotatable independent and removable can-holder, combined with the live-spindle, the normally-raised dead-spindle and its spring, the arm carrying it, and means, substantially as described, for lowering said dead-spindle against the action of said spring, substantially as described.

4. In a machine for securing end pieces to cans, the independent rotatable vertically-movable can-holder and the live-spindle, combined with the dead-spindle, the arm carrying it, and the vertically-movable frame for said dead-spindle, whereby said dead-spindle may be pressed upon the said can-holder to retain the can between it and the live-spindle, substantially as described.

5. In a machine for securing end pieces to cans, the independent removable and rotatable can-holder and the dead-spindle, combined with the live-spindle, independent thereof and having the disk $i$ upon its upper end, in which the can-body is placed, and the rotatable shaft for revolving said live-spindle, substantially as described.

6. In a machine for securing end pieces to cans, the independent recessed and rotatable can-holder and live and dead spindles, combined with the heated solder-plate $n$, placed adjacent to and partially surrounding one of the spindles, substantially as described.

7. In a machine for securing end pieces to cans, the recessed can-holder and spindles by which it and the can held by it are rotated when placed between the same, combined with the solder-plate $n$, having the semicircular can-receiving recess, the annular groove therein, and the solder-delivery recess leading from the top of the plate $n$ to the can-receiving recess just above the annular groove therein, substantially as described.

8. In a machine for securing end pieces to cans, the horizontally-movable block $a^2$, the upright rod, the hub $a^4$ on said rod, and a plurality of arms radiating therefrom, combined with a rotatable can-holder carried by each arm, and the plate $n$, having a curved recess therein, substantially as described.

9. In a machine for securing end pieces to cans, the block $a^2$, the rod $a^3$ and hub $a^4$ thereon, and a plurality of arms radiating from said hub, combined with recessed disks $c'$, having shanks $c$, which serve as can-holders, and the plate $n$, having a curved recess therein, substantially as described.

10. In a machine for securing end pieces to cans, the horizontally-movable block $a^2$, rod $a^3$, hub $a^4$ thereon, and a plurality of arms radiating from said hub, combined with the can-holders carried by said arms and the spindles between which the can-holders successively enter, and the plate $n$, having a curved recess concentric with and partly surrounding one of said spindles, substantially as described.

In testimony whereof I have signed my name to this specification in the presence of two subscribing witnesses.

JAMES A. BOOTH.

Witnesses:
BERNICE J. NOYES,
A. S. WIEGAND.